Figure 1:
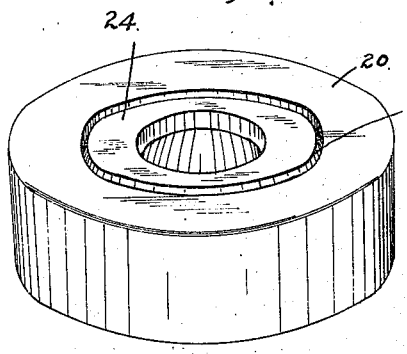

F. WHITNEY.
ROLLER BEARING.
APPLICATION FILED APR. 8, 1915.

1,183,788.

Patented May 16, 1916.
2 SHEETS—SHEET 1.

INVENTOR.
Frank Whitney
BY Barnett Truman
ATTORNEYS

F. WHITNEY.
ROLLER BEARING.
APPLICATION FILED APR. 8, 1915.
1,183,788.
Patented May 16, 1916.
2 SHEETS—SHEET 2.
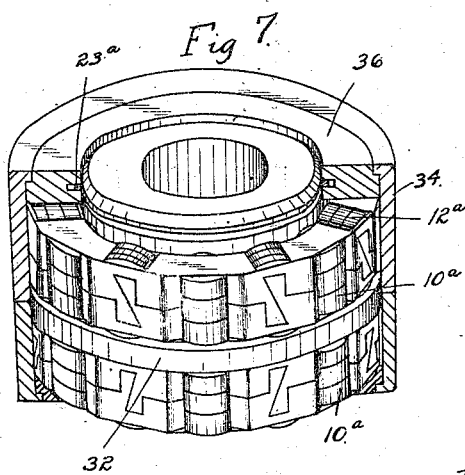
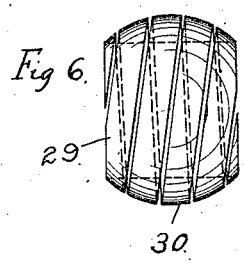
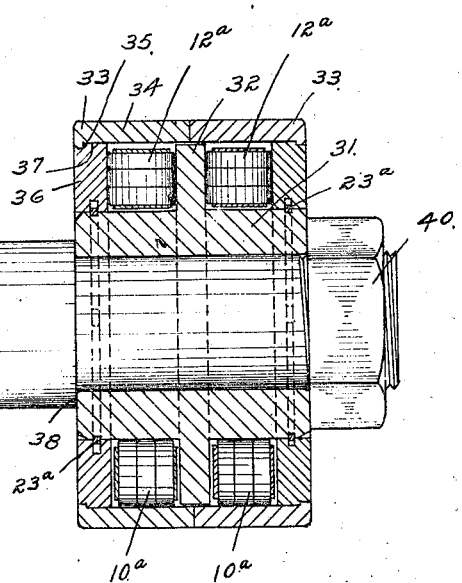
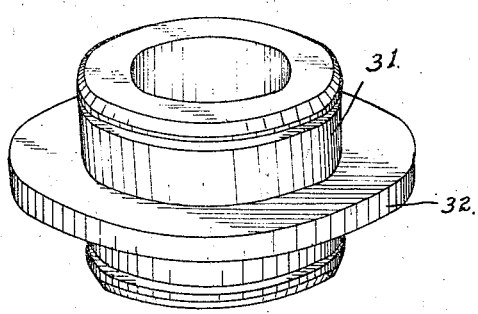
INVENTOR.
Frank Whitney
BY
Barnett Freeman
ATTORNEYS.

UNITED STATES PATENT OFFICE.

FRANK WHITNEY, OF HUBBARD WOODS, ILLINOIS.

ROLLER-BEARING.

1,183,788.   Specification of Letters Patent.   Patented May 16, 1916.

Application filed April 8, 1915. Serial No. 19,967.

*To all whom it may concern:*

Be it known that I, FRANK WHITNEY, a citizen of the United States, residing at Hubbard Woods, in the county of Cook and State of Illinois, have invented certain new and useful Improvements in Roller-Bearings, of which the following is a specification.

My invention relates to a roller bearing in which there are two sets of rollers in alternate arrangement with their axes at right angles to each other, one set taking the load exerted transversely of the axis of the bearing, that is, of the shaft in connection with which the bearing is used, and the other set taking whatever thrust there may be longitudinally of the shaft. A bearing of this general type is described and claimed in my Patent No. 690,626, patented January 7, 1902.

The present invention contemplates in particular certain improvements in a bearing of this type although some of these improvements might be utilized in connection with other sorts of anti-friction bearings.

One of the principal objects of the invention is to form and construct the elements of a bearing of the type above described so that when they are assembled they will form a complete self-contained bearing which may be sold as a unitary structure or accessory part and may be so handled in putting it in place, or removing it from the piece of machinery with which it is used, the device being, furthermore, constructed preferably so as to be interchangeable with the ordinary bearings of standard type.

A further object is to provide a bearing which will be incapable of adjustment and in which the operative parts are permanently inclosed by elements forming a raceway for the rollers, which elements are so interlocked that when once assembled the bearing cannot be tampered with. This is an advantage because in many instances bearings are injured by unskilful attempts to adjust them.

A further object is to provide a retaining and spacing cage for the rollers of a bearing of this type which will be light, durable, conveniently assembled and inexpensive to manufacture and will have certain other improved features to be hereinafter described and claimed.

A further object is to improve and simplify the construction of the elements constituting the race-way and inclosing casing for the rollers.

A further object is to provide in a bearing of this type two sets of thrust rollers in parallel arrangement.

A further object is to provide a bearing with a sleeve which is interposed between the bearing proper and the shaft, upon which the bearing may have a slight rocking movement whereby it will accommodate itself to the shaft even if the latter is a trifle bent or sprung. Preferably this sleeve is engaged with the bearing so that it forms a part of the unitary or self-contained structure.

The invention has for further objects such other new and improved constructions, arrangements and devices relating to bearings as will be hereinafter described and claimed.

The invention is illustrated, in certain preferred embodiments, in the accompanying drawings, wherein—

Figure 2:
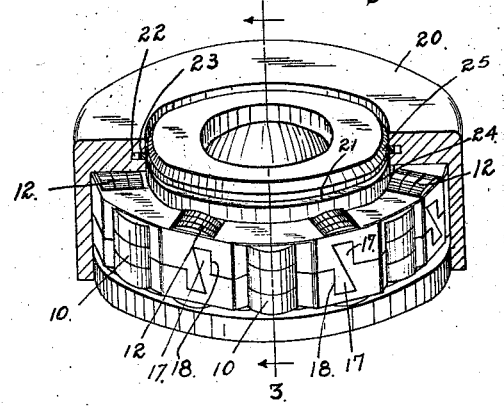
Figure 4:
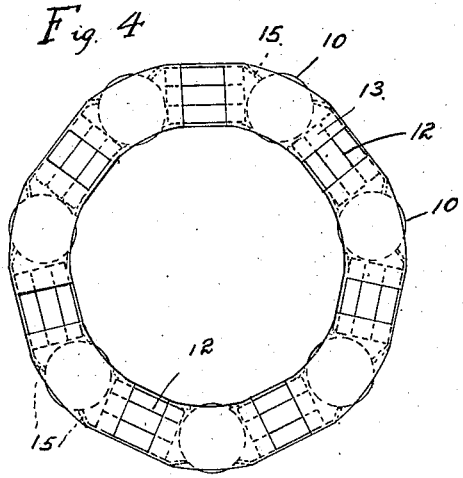
Figure 3:
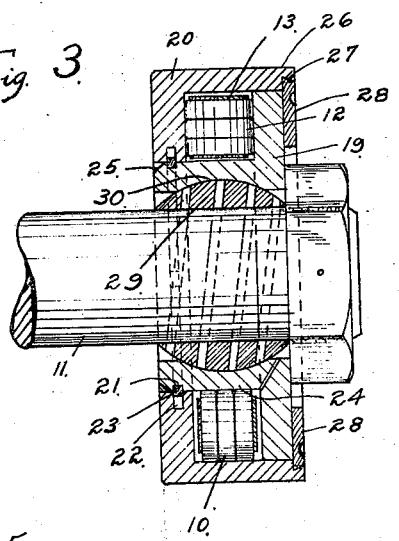
Figure 5:
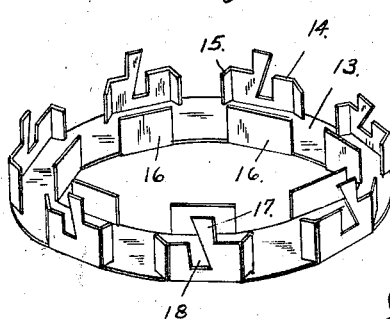

Figure 1 is a view, in perspective, of a bearing constructed in accordance with my invention and having a single set of load carrying rollers and a single set of thrust rollers. Fig. 2 is a view similar to Fig. 1 but partially in section so as to show certain of the rollers and a part of the retaining and spacing cage. Fig. 3 is a sectional view taken on line 3—3 of Fig. 2. Fig. 4 is a plan view of the roller cage with the rollers mounted therein. Fig. 5 is a view, in perspective, of one of the two elements or rings forming the cage. Fig. 6 is a view, in elevation, of an expansible sleeve which is preferably interposed between the bearing and the shaft forming, when assembled, a structural part of the bearing. Fig. 7 is a view similar to Fig. 2 illustrating a bearing constructed in accordance with my invention having capacity for taking longitudinal thrusts in both directions. Fig. 8 is a sectional view of the bearing shown in Fig. 7, and Fig. 9 is a view, in perspective, of the inner element of the race-way in the bearing shown in the preceding two figures.

Like characters of reference designate like parts in the several figures of the drawings.

Referring first to Figs. 1 to 6 inclusive, the rollers for taking the radial load are designated by the numeral 10, the axes of these rollers being parallel to the axis of the bearing, that is, parallel to the shaft 11 in connection with which the bearing is used. These rollers preferably consist, in each case, of a plurality of separate independently revoluble disks. For example, each roller may be made up of three of such disks as shown. The reason for this is that because of load conditions, it will be readily understood, one end of a roller may be subjected to greater stress than the other end. If the rollers were unitary this would result in uneven wear. In alternate arrangement between the rollers 10 are thrust rollers 12 also preferably composed, in each case, of a plurality of disks, the axes of the rollers 12 standing at right angles to the axes of the rollers 10. That is, the axes of rollers 12 are on lines radial to the axis of the bearing.

The rollers 10 and 12 are held in spaced relation with each other by a housing consisting of two interlocked identically constructed members, each composed of a ring 13 (Fig. 5) formed at its outer circumference with flat spacing members 14 provided preferably with inturned lips 15 and on its inner circumference with preferably flat spacing members 16 arranged opposite the spacing members 14. The thrust rollers 12 are arranged between the pairs of spacing members 14, 16 with their ends bearing against said spacing members which are made flat so that the wear of the plates due to contact with the rollers will be even. The load carrying rollers 10 are arranged in the spaces between the pairs of spacing members, the ends of the rollers bearing against the rings 13 which are flat. The spacing members 14, or at least some of them, are formed with projecting lugs 17 of a configuration to interlock with similarly formed notches 18 formed in the corresponding spacing members of the other ring. The elements of the cage may be assembled with the members between them by springing one member over the other, the interlocked relation between the parts of the cage being shown in Fig. 2.

The roller cage so formed is inclosed within a hollow structure which forms a four-sided race-way for the rollers. This structure is composed preferably of an inner annular member 19 which is L-shaped in cross section and an outer annular member 20 of the same general cross-sectional configuration. Preferably the bearing elements 19 and 20 are locked together so that when once assembled they cannot be taken apart. I have shown two expedients for providing this permanent lock, either or both of which may be employed. The inner element 19, for example, is formed with a groove 21, preferably rectangular in cross section, and the outer member 20 with a similar groove 22 which, however, is deeper than the groove 21. At 41 is shown an oil passageway which is bored radially through the inner wall of the race-way to prevent waste of oil by centrifugal force; also the washer 28 forms a liquid-tight joint between elements 19 and 20 and thus prevents waste from the same cause. The ring 23 coöperates with ring 28 and elements 19 and 20 to form a substantially liquid-tight oil chamber. These grooves register when the elements are assembled. An elastic, expansible ring 23, preferably rectangular in cross section, is placed in the groove 22. When the hub portion 24 of the inner element with the roller cage thereon is pushed into the opening in the outer element the elastic ring 23 is forced back into groove 22, the groove being deeper than the radial dimension of the ring. As soon as groove 21 comes into alinement with groove 22 the ring snaps into groove 22. As the depth of the latter groove is less than the radial dimension of the ring the ring provides a lock which prevents the elements 19, 20 from being separated. Preferably the extremity of the hub portion 24 of element 19 is beveled as indicated at 25 to facilitate the assembling of the parts. The outer circumferential portion 26 of the outer element 20 preferably projects beyond the element 19 when the parts of the bearing are assembled and is formed with a preferably undercut rabbet 27. 28 is a washer of ordinary construction which fits within the projecting edge of the outer element 20 and against the inner element 19. The outer edge of the washer is swaged or pressed into the undercut portion of the rabbet 27 after the parts have been assembled. I preferably use this expedient for locking the elements together in addition to the expansible ring and groove arrangement already described as a further precaution for making it certain that the bearing cannot be tampered with. Moreover, the washer thus swaged into the bearing acts as a dust guard. This is true also of the ring 23 which prevents the entrance of dust into the bearing from the other side thereof.

An expansible sleeve 29, the outer surface 30 of which is rounded transversely, preferably on an arc struck from a point on the axis of the bearing, is interposed between the inner element 19 and the shaft 11, the inner surface of element 19 being correspondingly curved. The sleeve 29 is made in any suitable manner. For example, it may be in the form of a helix as shown in Fig. 6. When so constructed the sleeve will contract when being forced into the bearing and will then expand so that, in effect, it forms a part of the unitary bearing structure. With the bearing mounted upon the shaft in this manner, should the shaft become a trifle bent, the bearing is not cramped thereby but will, to a certain extent, accommodate itself to the irregularity.

In Figs. 7 to 9 inclusive, I have shown a bearing constructed on the same principle as that above described but having two sets of thrust rollers 12ª, 12ª and preferably also two sets of load bearing rollers 10ª, 10ª. This necessitates providing the bearing with two four-sided race-ways and this is accomplished preferably by the following constructions. The inner element 31 is formed centrally thereof with a projecting annular member 32. The two sets of rollers, which may be inclosed in cages constructed as above described, are mounted on the element 31 on opposite sides of the annular member 32. The race-ways are completed by two annular members 33, 33, which may be locked to the inner element by elastic rings 23ª corresponding to the rings 23 just described. As a matter of convenience in manufacture the outer elements 33 are preferably made in two parts, an outer or circumferential part 34, preferably formed with a rabbet 35, and a head or disk portion 36 formed with a projection 37 adapted to fit into the rabbet 35. The inner element 31 of the bearing abuts against a shoulder 38 on the shaft 39. The other side of the bearing is held from longitudinal movement on the shaft by the usual nut 40.

While I have described my invention in certain preferred embodiments, it will be understood that modifications might be made without departure from the principles of the invention. Therefore I do not wish to be understood as limiting the invention to the particular constructions, arrangements and devices shown and described except so far as such limitations are embodied in the claims. While the primary object of the invention is to provide improvements upon a bearing of the type disclosed in which there are thrust rollers in alternate arrangement with the load carrying rollers so that the bearing takes up both radial stresses and end thrusts, it is realized that certain of the improvements above described might be employed in connection with bearings of different types.

It will be understood that a sleeve, such as is shown in the first six figures, might also be employed in connection with the bearing shown in Figs. 7 to 9 inclusive. Likewise the annular elements 19 and 20 employed in the bearing shown in Figs. 1 to 6 inclusive, might be two-part structures such as the corresponding elements 33 in the other form of the invention. As the interchangeability of these parts is obvious it was not thought necessary to encumber the drawings by showing further modifications.

I claim:

1. In a bearing, the combination of a set of rollers having their axes parallel to the axis of the bearing, a set of rollers with their axes radially disposed with respect to the axis of the bearing, annular members L-L-shaped in cross section inclosing said rollers and providing a race-way for the same, and means for locking said elements one to the other.

2. In a bearing, the combination of a set of rollers having their axes parallel to the axis of the bearing, a set of rollers with their axes radially disposed with respect to the axis of the bearing, annular members L-shaped in cross section inclosing said rollers and providing a race-way for the same, and means providing a permanent lock between said elements which is inaccessible from outside of the bearing.

3. In a bearing, the combination with a set of rollers having their axes parallel to the axis of the bearing, a set of rollers with their axes radially disposed with respect to the axis of the bearing, an annular structure inclosing the rollers and forming a race-way for the same, and a sleeve within said annular structure the contacting surfaces of said annular structure and sleeve being curved transversely of the same, for the purpose described.

4. In a bearing, the combination with a set of rollers having their axes parallel to the axis of the bearing, a set of rollers with their axes radially disposed with respect to the axis of the bearing, an annular structure inclosing the rollers and forming a race-way for the same, and a sleeve within said annular structure and expansible radially thereof, the contacting surfaces of said annular structure and sleeve being curved transversely of the same, for the purpose described.

5. In a bearing, the combination of a set of rollers having their axes parallel to the axis of the bearing, a set of rollers with their axes radially disposed with respect to the axis of the bearing, annular members L-shaped in cross section inclosing the rollers and providing a race-way for the same, and a sleeve within said bearing, the outer surface of said sleeve and the surface of the annular element with which the sleeve contacts being curved transversely, for the purpose described.

6. In a bearing, the combination of a set of rollers having their axes parallel to the axis of the bearing, a set of rollers with their axes radially disposed with respect to the axis of the bearing, annular members L-shaped in cross section inclosing the rollers and providing a race-way for the same, and an expansible sleeve within said bearing, the outer surface of said sleeve and the surface of the annular element with which the sleeve contacts being curved transversely, for the purpose described.

7. In a bearing, the combination of a set of rollers having their axes parallel to the axis of the bearing, a set of rollers with their axes radially disposed with respect to the axis of the bearing, annular members shaped in cross section inclosing the rollers and providing a race-way for the same, an expansible sleeve within said bearing, the outer surfaces of said sleeve and the surface of the annular element with which the sleeve contacts being curved transversely, and means providing a lock between said annular members whereby the bearing forms a unitary structure.

8. In a bearing, the combination of anti-friction members, an annular structure forming a raceway for the same, and a radially expansible sleeve within said annular structure, the contacting surfaces of said structure and sleeve being curved transversely, for the purpose described.

9. In a bearing, the combination of anti-friction members, an annular structure forming a raceway for the same and composed of two elements L-shaped in cross section formed on their meeting surfaces with alining grooves, and an elastic ring within said grooves which locks one element to the other.

10. In a bearing, the combination of anti-friction members, an annular structure forming a raceway for the same and composed of two elements L-shaped in cross section, the edge of one of which projects beyond the other, and an annular plate which lies flatwise against said other element and engages the projecting edge of the first named element, for the purpose described.

11. In a bearing, the combination of anti-friction members, an annular structure forming a raceway for the same and composed of two elements L-shaped in cross section, the edge of one of which projects beyond the other and is formed with an undercut rabbet, and an annular plate which lies flatwise against said other element and has its edge swaged into the rabbet of the first named element.

12. In a bearing, the combination of anti-friction members, an annular structure forming a race-way for the same and composed of two elements L-shaped in cross section formed on their meeting surfaces with alining grooves, an elastic ring within said grooves which locks one element to the other, the opposite edge of one of said elements projecting beyond the other element, and an annular plate which lies flatwise against said other element and engages the projecting edge of the first named element.

13. In a bearing, the combination of a set of rollers having their axes parallel to the axis of the bearing, a set of rollers with their axes radially disposed with respect to the axis of the bearing, annular members L-shaped in cross section inclosing said rollers and providing a race-way for the same, said elements being formed on their meeting edges with alining grooves, and an elastic ring in said grooves which locks one element to the other.

14. In a bearing, the combination of a set of rollers having their axes parallel to the axis of the bearing, a set of rollers with their axes radially disposed with respect to the axis of the bearing, annular members L-shaped in cross section inclosing said rollers and providing a race-way for the same, said elements being formed on their meeting edges with alining grooves, an elastic ring in said grooves which locks one element to the other, one of said elements projecting beyond the other element, and an annular plate which lies flatwise against said other element and engages the projecting edge of the first named element.

15. In a bearing, the combination of a set of rollers having their axes parallel to the axis of the bearing, a set of rollers with their axes radially disposed with respect to the axis of the bearing, annular members L-shaped in cross section inclosing said rollers and providing a race-way for the same, one of said elements projecting laterally beyond the other element, and an annular plate which lies flatwise against said other element and engages the projecting edge of the first named element.

16. In a bearing, the combination of a set of rollers having their axes parallel to the axis of the bearing, a set of rollers with their axes radially disposed with respect to the axis of the bearing, annular members L-shaped in cross section inclosing said rollers and providing a race-way for the same, said elements being formed on their meeting edges with alining grooves, an elastic ring in said grooves which locks one element to the other, one of said elements projecting beyond the other element, an annular plate which lies flatwise against said other element and engages the projecting edge of the first named element, and an expansible sleeve within the inner annular element, the contacting surfaces of said sleeve and inner element being curved transversely of the same, for the purpose described.

17. In a bearing, the combination of a set of rollers having their axes parallel to the axis of the bearing, a set of rollers with their axes radially disposed with respect to the axis of the bearing, and a cage for said rollers composed of two rings formed with oppositely disposed pairs of spacing members projecting from the outer and inner edges of the rings, the spacing members of one ring interlocking with those of the other.

18. In a bearing, the combination of a set of rollers having their axes parallel to the axis of the bearing, a set of rollers with their axes radially disposed with respect to the axis of the bearing, and a cage for said rollers composed of two rings formed with oppositely disposed pairs of spacing members projecting from the outer and inner edges of the rings, the spacing members being formed with coengaging dove-tailed recesses and lugs whereby the recesses are interlocked.

19. In a bearing, the combination of a set of rollers having their axes parallel to the axis of the bearing, a set of rollers with their axes radially disposed with respect to the axis of the bearing, and a cage for said rollers composed of two rings formed with oppositely disposed pairs of flat spacing members projecting from the outer and inner edges of the rings, the spacing members of one ring interlocking with those of the other.

20. In a bearing, the combination of cylindrical anti-friction elements adapted to receive only stresses radially of the shaft in connection with which the bearing is used, other cylindrical anti-friction elements adapted to receive only thrusts longitudinally thereof, and a unitary structure inclosing said anti-friction members forming a four-sided race-way therefor.

21. In a bearing, the combination of cylindrical anti-friction elements adapted to receive only stresses radially of the shaft in connection with which the bearing is used, other cylindrical anti-friction elements adapted to receive only thrusts longitudinally thereof, two annuli L-shaped in cross section forming a four-sided raceway for said elements, and means carried by said annuli for retaining them against relative movement in the direction of their common axis.

22. In a bearing, the combination of cylindrical anti-friction elements adapted to receive only stresses radially of the shaft in connection with which the bearing is used, other cylindrical anti-friction elements adapted to receive only thrusts longitudinally thereof, two annuli L-shaped in cross section forming a four-sided raceway for said elements, and means carried by said annuli for joining them into a unitary structure.

23. In a bearing, the combination of cylindrical anti-friction elements adapted to receive only stresses radially of the shaft in connection with which the bearing is used, other cylindrical anti-friction elements adapted to receive only thrusts longitudinally thereof, a cage for said elements comprising duplicate halves formed with interlocking members, two annuli L-shaped in cross section forming a four-sided raceway for said elements, and means carried by said annuli for joining them into a unitary structure.

24. In a bearing, the combination of cylindrical anti-friction members adapted to receive only stresses radially of the shaft in connection with which the bearing is used, other cylindrical anti-friction elements adapted to receive only thrusts longitudinally thereof, two annuli L-shaped in cross-section, the edge of one of which projects beyond the other, and a plate engaging said projecting edge for retaining said annuli against relative movement in the direction of their common axis.

25. A cage for anti-friction elements comprising duplicate halves each of which is formed with lugs which engage the walls of apertures provided in the other.

26. A cage for anti-friction elements comprising duplicate halves each of which is formed with inner and outer peripheral spacing members, and with lugs which engage the walls of apertures provided in the other.

27. A cage for anti-friction elements comprising duplicate halves each of which is formed with undercut lugs which dovetail into apertures provided in the other.

28. A cage for anti-friction elements comprising duplicate halves each of which is formed with inner and outer peripheral spacing members and with undercut lugs which dovetail into apertures provided in the other.

29. The combination of an annular structure forming a raceway for anti-friction members, a shaft, and a resilient sleeve forming a ball and socket connection between said raceway and shaft.

30. The combination with anti-friction members, of a raceway therefor comprising two annuli L-shaped in cross section, the outer cylindrical portion of one projecting beyond the flat portion of the other, and a ring which engages said portions, prevents the separation of said annuli, and forms a liquid-tight joint between them.

31. The combination with anti-friction members, of a raceway therefor comprising two annuli L-shaped in cross section, the outer cylindrical portion of one projecting beyond the flat portion of the other, and a ring which engages said portions, prevents the separation of said annuli, and forms a liquid-tight joint between them, said raceway having a radial oil passageway in its inner wall only.

FRANK WHITNEY.

Witnesses:
L. A. FALKENBERG,
G. Y. SKINNER.

Corrections in Letters Patent No. 1,183,788.

It is hereby certified that in Letters Patent No. 1,183,788, granted May 16, 1916, upon the application of Frank Whitney, of Hubbard Woods, Illinois, for an improvement in "Roller-Bearings," errors appear in the printed specification requiring correction as follows: Page 2, line 62, beginning with "At 41" strike out to and including line 70, same page; same page, after line 109, as now numbered, insert the sentences *At 41 is shown an oil passageway which is bored radially through the inner wall of the race-way to prevent waste of oil by centrifugal force; also the washer 28 forms a liquid-tight joint between elements 19 and 20 and thus prevents waste from the same cause. The ring 23 coöperates with ring 28 and elements 19 and 20 to form a substantially liquid-tight oil chamber.;* and that the said Letters Patent should be read with these corrections therein that the same may conform to the record of the case in the Patent Office.

Signed and sealed this 25th day of July, A. D., 1916.

[SEAL.]

F. W. H. CLAY,
*Acting Commissioner of Patents.*

Cl. 64—62.